(12) United States Patent
Katsuda et al.

(10) Patent No.: US 6,328,337 B1
(45) Date of Patent: *Dec. 11, 2001

(54) AIR BAG GAS GENERATOR AND AIR BAG SYSTEM

(75) Inventors: Nobuyuki Katsuda; Shogo Tomiyama, both of Himeji (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/959,925

(22) Filed: Oct. 29, 1997

(30) Foreign Application Priority Data

Aug. 12, 1997 (JP) .................................................. 9-217844

(51) Int. Cl.⁷ ..................................................... B60R 21/28
(52) U.S. Cl. ....................................... 280/741; 102/202.9
(58) Field of Search ................................. 280/741, 736, 280/731, 728.2; 102/202.5, 202.9, 202.11, 202.12, 202.14

(56) References Cited

U.S. PATENT DOCUMENTS

| | | | |
|---|---|---|---|
| 712,826 | * | 11/1902 | Mason ................. 102/202.9 |
| 4,335,654 | * | 6/1982 | Bratt ................... 102/202.9 |
| 4,578,247 | * | 3/1986 | Bolieau ................ 280/741 |
| 5,200,574 | | 4/1993 | Cunningham et al. . |
| 5,280,951 | * | 1/1994 | Rizzi et al. ............ 280/741 |
| 5,423,568 | * | 6/1995 | Zushi et al. ........... 280/741 |
| 5,750,922 | * | 5/1998 | Seeger ................. 280/741 |
| 5,773,754 | * | 6/1998 | Yamato ................ 280/741 |

FOREIGN PATENT DOCUMENTS

| | | |
|---|---|---|
| 0512682A2 | 11/1992 | (EP) . |
| 0722860A1 | 7/1996 | (EP) . |
| 2288866A | 11/1995 | (GB) . |

* cited by examiner

Primary Examiner—Eric Culbreth
Assistant Examiner—James S. McClellan (57) ABSTRACT

An air bag gas generator, which ensures that a lead wire has a sufficient length when installing the generator in a module, is provided even when a connector in the air bag gas generator has a predetermined length. The air bag gas generator includes: a housing having gas discharge ports and an ignitor storage opening; an ignitor activated by an impact; a gas generant ignited by the ignitor that burns and generates a combustion gas; and a filter that cools the combustion gas and/or collects combustion residues. Also, the ignitor includes an initiator that is activated by an electrical signal, and an enhancer that is ignited by the activation of the initiator and burns. The initiator is positioned and then installed in the housing.

8 Claims, 8 Drawing Sheets

AIR BAG GAS GENERATOR AND AIR BAG SYSTEM

FIELD OF THE INVENTION

This invention is directed to an air bag gas generator and air bag system for protecting a passenger from impacts, and in particular, a gas generator for an air bag using an igniting means which includes an initiator that is activated by an electrical signal.

DESCRIPTION OF THE RELATED ART

An air bag system is attached to a vehicle, such as an automobile, etc., for the purpose of protecting a passenger from an impact due to a collision. In this air bag system, when a sensor detects an impact, a gas generator is activated, and a cushion (air bag) is formed between the passenger and the vehicle. The gas generator is activated in such a way that the sensing of the impact by the impact sensor activates igniting means, causing gas generating means to burn and generate a combustion gas. Conventionally, for such a gas generator, there are a mechanical ignition type gas generator, which is activated by sensing an impact exclusively by means of a mechanical method, and an electrical ignition type gas generator, which is activated by an electrical signal transmitted from an impact sensor, such as a semiconductor-type acceleration sensor, etc., that senses an impact.

Among these gas generators, in the electrical ignition type gas generator, in particular, the signal from the electrical sensor upon detection of an impact, is transmitted via a lead wire to an initiator which is contained in the housing. The initiator is activated by the electrical signal to ignite and burn an enhancer. The flame from the burning enhancer ignites and burns gas generating means to generate combustion gas. Also, the initiator may, in some cases, directly ignite and burn the gas generating agents instead of the enhancer. The combustion gas generated in the housing flows into the air bag from gas discharge ports provided in the housing. Therefore, in the electrical ignition type gas generator, it is necessary for the initiator, which is contained in the housing and actually activates the gas generator, to be connected to the electrical sensor, which senses the impact and outputs a signal, provided outside the housing.

However, the lead wire extending from the initiator has a directional property. Therefore, in the conventional gas generator for an air bag, the lead wire would be slack or too short depending on the direction which the initiator has been installed, causing the lead wire to be too short for connecting to the electrical sensor.

SUMMARY OF THE INVENTION

The present invention solves these problems found in the above-mentioned conventional air bag gas generator and provides an air bag gas generator which ensures that the length of the lead wire is sufficient, even if the length of the connector in the air bag gas generator is predetermined, when installing this gas generator in the module.

The air bag gas generator according to the present invention is characterized in that it uses igniting means having an initiator, which is exclusively activated by an electrical signal and by installing the ignitor in the housing after the initiator has been positioned.

That is, the air bag gas generator of the present invention comprises, in a housing having gas discharge ports and an igniting means storage hole: igniting means activated by an impact; gas generating means ignited by the igniting means and burns and generates a combustion gas; and a coolant/filter, which cools the combustion gas and/or collects the combustion residue; and by having the igniting means composed to include an initiator which is activated by an electrical signal, with the initiator being positioned and then installed in the housing.

The positioning of the initiator can be done, for instance, by forming a positioning portion in the initiator collar, to which the lower portion of the initiator is fitted, forming, in an insertion jig for inserting the initiator, an engaging portion which engages the positioning portion in the initiator collar, and engaging the positioning portion of the initiator collar with the engaging portion in the insertion jig. Such a positioning portion can be obtained by forming a step helix by cutting a portion of the bottom surface of the initiator collar into a step helix form in the radial direction while retaining the edge portion thereof, or by forming a groove by cutting a portion of the bottom surface of the initiator collar in the radial direction. Especially, when the positioning portion is formed by cutting a portion of the bottom surface of the initiator collar into the step helix form in the radial direction, while retaining the circumference of the initiator collar, the air bag gas generator which utilizes the initiator can, even when in operation, more securely and advantageously prevent the leakage of the combustion gas from any gap between the inner surface of the portion containing the initiator and the outer circumferential surface of the initiator collar.

The engagement between the positioning portion of the initiator collar and the engaging portion of the insertion jig is achieved, for instance, by: forming the engaging portion of the insertion jig as a fitting protrusion which complementarily fits in the positioning portion formed as described above; complementarily fitting the fitting protrusion to the above-mentioned positioning portion; and disposing the initiator in the housing while positioning it. When a gas generator attachment portion, which attaches the air bag gas generator to a module case, is formed in the housing and the initiator is positioned with respect to the gas generator attachment portion, it is possible to position the initiator using the insertion jig that has been positioned to the gas generator attachment portion and then install the initiator in the housing. By positioning the initiator and then installing it in the housing, the orientation of the electric conductive terminals of the initiator becomes constant. As a result, the lead wire can be drawn in a fixed direction, allowing a reliable connection of the initiator and the sensor with the lead wire. With respect to the positioning of the initiator, aside from using the insertion jig as described above, the initiator can also be positioned by forming, for instance, a groove or protrusion in the storage opening for storing the initiator and also forming, on the outer circumferential surface of the initiator or the initiator collar provided at the lower portion of the initiator collar, a protrusion or groove which complementarily fits the groove or protrusion formed in the above-mentioned storage opening for the initiator, and then fitting them together.

In the present invention, except for the initiator and initiator collar, any conventionally used elements required to operate the gas generator, such as a "housing" having gas discharge ports, "gas generating means" for generating gas by combustion, "filter means" for purifying and cooling the generated gas, can be used. Further, other structures and members for an air bag gas generator advantageous to the operation of the air bag gas generator, such as: an "inner cylindrical member," which partitions the inside of the housing into two or more chambers; a "filter support member," which is provided between the inner cylindrical member and the filter means, and which supports the filter means; "short-pass preventing means (plate member, etc.)," which encloses the top end and/or bottom end of the inner circumference of the filter means and which prevents the gas generated from passing through the gap between the filter means and housing inner surface; a "cushion member," which is provided above and/or below the gas generating means to prohibits the gas generating means from moving; a "perforated basket," which has multiple holes, is cylindrical in shape, and is provided on the inner side of the filter means to prevent the gas generating means from directly contacting the filter means and to also protect the filter means from the flames from the combustion of the gas generating means; and a "plenum," which is provided between the outer surface of the filter means and the inner surface of the side wall of the housing and which functions as a gas channel, can be used as desired.

The housing can be formed by casting, forging, or press work, etc. The housing is preferably formed by welding a diffuser shell having gas discharge ports and a closure shell having the igniting means storage hole. The two shells can be joined by various welding methods, such as: electron-beam welding; laser welding; TIG welding; projection welding; etc. When forming the housing by welding the diffuser shell with the closure shell, the cylindrical member is welded and incorporated into the inner surface of a circular area of the diffuser shell. When the diffuser shell and the closure shell are formed by press-molding steel sheet, such as stainless steel sheets, etc., the manufacture of the two shells becomes easy and a reduction in manufacturing cost is achieved. Also, by forming the two shells into simple cylindrical shapes, the press-molding becomes easy. As for the material for the diffuser shell and closure shell, stainless steel sheet is desirable, but nickel-plated steel sheet may be used.

In the air bag gas generator of the present invention, in particular, positioning of the initiator is performed. Therefore, an electrical ignition type, which is activated by an electrical signal transmitted from an impact sensor sensing an impact, is used as the igniting means. This electrical ignition type igniting means comprises: an electrical sensor, which senses an impact exclusively by means of an electrical mechanism; and an initiator, which is activated by an electrical signal from the electrical sensor sensing an impact. For this electrical sensor, there are, for instance, a semiconductor-type acceleration sensor, etc. The semiconductor-type acceleration sensor has four semiconductor strain gauges formed on a silicon substrate beam, which is designed to be deflected when acceleration occurs. These semiconductor strain gauges are bridge connected. When acceleration occurs, the beam is deflected, and the surface is strained. Because of this strain, the resistance of the semiconductor strain gauges changes, and this resistance change is detected as a voltage signal that is proportional to the acceleration. In the electrical ignition type igniting means, in particular, a control unit, further having an ignition evaluation circuit, may be included. The signal from the above-mentioned semiconductor type acceleration sensor is inputted in the ignition evaluation circuit. The control unit begins its calculation at the point at which the impact signal exceeds a certain value. It, then, outputs the activation signal to the gas generator when the calculation result exceeds a certain value.

As the gas generating means, agents based on inorganic azide which has been widely known in the art, in particular a sodium azide, for instance, an equivalent mixture of soda azide and copper oxide, or a non-azide gas generating agent can be used. Various non-azide gas generating agent compositions have been proposed. For example, known compositions are ones primarily composed of an organic compound containing nitrogen, such as tetrazole, triazole, or the metal salts of these, etc., and an oxidizing agent containing oxygen, such as alkali metal nitrate, etc., and compositions using as their fuel and nitrogen source triaminoguanidine nitrate, carbohydrazide, nitroguanizine, etc., and using, as their oxidizing agent, the nitrate, chlorate, perchlorate, etc., of an alkali metal or alkali earth metal. Any one of these agents, but not limited thereto, may be used as the gas generating means in the present invention. They are selected as needed according to the burning rate, non-toxicity, and combustion temperature requirements. The gas generating means is used in the appropriate shape, such as a pellet, a wafer, a hollow cylinder, multiple holes, a disc, etc.

The filter means, which is accommodated and installed in the housing, is approximately cylindrical in shape. The filter means removes combustion residues produced by the combustion of the gas generating means and cools the combustion gas. As for the filter means, a filter for purifying the generated gas and/or a coolant for cooling the generated gas, which are known in the art, can be used. Aside from these, a laminated wire mesh filter, etc., formed by compression-molding a ring-shaped laminated form of wire mesh composed of an appropriate material, may also be used. More specifically, the laminated wire mesh filter can be formed by: shaping a plain stitch stainless steel wire mesh into a cylindrical body; forming a ring-shaped laminated shape by repeatedly bending one end of the cylindrical body outward; and compression-molding this laminated body in a mold. It may also be formed by shaping a plain stitch stainless steel wire mesh into a cylindrical body, forming the cylindrical body into a sheet by radially pressing the cylindrical body, forming a laminated body by rolling this sheet many times into a multi-layer body to form a cylindrical shape, and compression-molding the laminated body in a mold, etc. The material used for the wire mesh may be stainless steel, such as SUS304, SUS310S, SUS316 (JIS standard code), etc. SUS304 (18Cr-8Ni-0.06C) stainless steel exhibits excellent corrosion resistance as does austenitic stainless steel.

The filter means can also employ a dual structure, having an inner layer or an outer layer composed of a laminated wire mesh body. The inner layer may have a filter means protection function for protecting the filter means against the flame from the igniting means bursting toward the filter means and also protecting the filter means from the combustion gas generated by the gas generating means. The outer layer may have a filter means expansion-suppressing function to prevent the plenum formed between the filter means and the outer wall of the housing from being blocked by the expansion of the filter means due to the gas pressure generated when the gas generator is operated. Incidentally, the function to prohibit expansion of the filter means can be achieved by supporting the outer circumference of the filter means with an outer layer made of a laminated wire mesh body, a perforated cylindrical body, a ring-shaped belt body, etc.

The above-mentioned gas generator for an air bag is placed inside a module case along with an air bag that is inflated by introducing the gas generated by the gas generator to constitute an air bag system.

In the air bag system, coupled with the impact sensor, the gas generator is activated and combustion gas is discharged from the gas discharge ports in the housing. The combustion gas is discharged into the air bag, and because of this, the air bag ruptures the module cover and inflates. This creates a cushion for absorbing the impact between hard structures and a passenger inside a vehicle.

In the present invention, by positioning the initiator and then installing it in the housing, the orientation of the electrically conductive terminals of the initiator is fixed. As a result, the lead wire, which is connected to the terminals, can be drawn in a specified direction.

In the gas generator of the present invention, the lead wire can be drawn in a specified direction; thus, installation of the gas generator to the module can be performed reliably with good reproducibility.

BRIEF DESCRIPTION OF THE INVENTION

DETAILED DESCRIPTION OF THE PREFERRED EMBODIMENTS

Preferred embodiments of the present invention will be described in the following with reference to the drawings.

Figure 1:
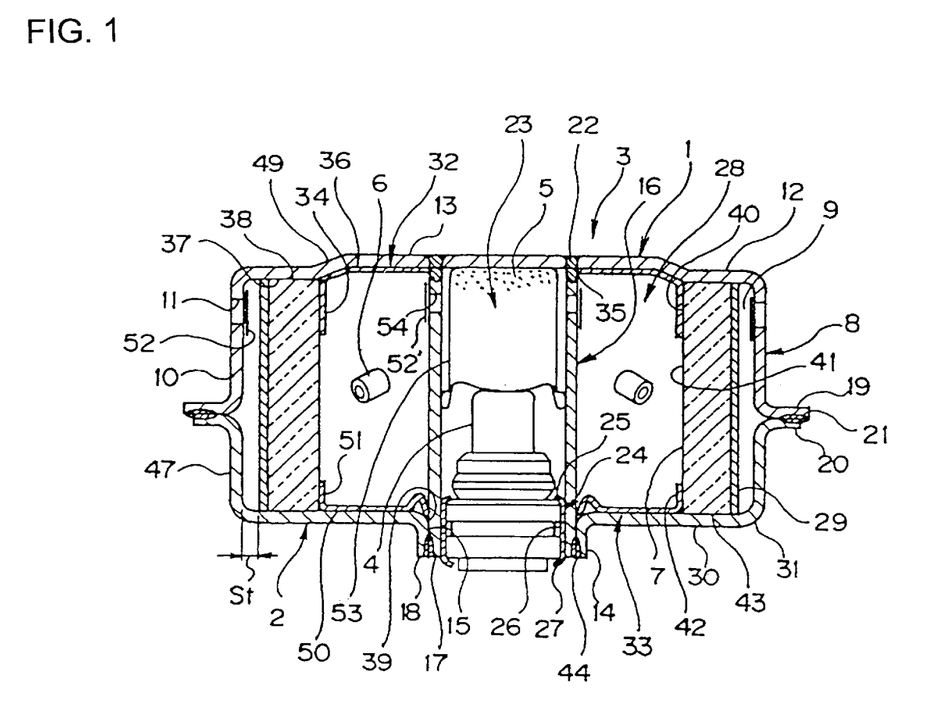
FIG. 1 is a vertical cross-sectional view showing one embodiment of the gas generator of the present invention.

FIG. 1 is a cross-sectional view of an air bag gas generator according to the present invention. The present embodiment is effective as a gas generator primarily with the housing having an outer diameter of about 70 mm. This gas generator includes: a housing 3 having a diffuser shell 1 and a closure shell 2; electrical ignition type igniting means provided in a storage space in the housing 3, i.e., an initiator 4 and enhancer 5; gas generating means ignited by the initiator 4 and enhancer 5 and generates a combustion gas, i.e., solid gas generating agents 6; and filter means defining a combustion chamber 28 for containing the gas generating agents 6, i.e., a coolant/filter 7.

The diffuser shell 1, formed by pressing a stainless steel sheet, has: a circular portion 12; a circumferential wall portion 10, formed on the outer circumferential portion of the circular portion 12; and a flange portion 19, which is located at the tip of the circumferential wall portion 10 and which extends outwardly in the radial direction. In this embodiment, the circumferential wall portion 10 is provided with eighteen 3 mm diameter gas discharge ports 11 at equal intervals in the circumferential direction. A protruding circular portion 13, which protrudes outwardly due to a reinforced step 49, is formed at the center of the circular portion 12 of the diffuser shell 1. The reinforced step 49 provides stability to the housing, especially to the diffuser shell circular portion 12 that forms its ceiling portion. The step 49 also increases the capacity of the storage space. An enhancer container 53, which contains the enhancer 5, is held between the protruding circular portion 13 and the initiator 4.

The closure shell 2, formed by pressing a stainless steel sheet, has: a circular portion 30; a central opening 15, formed at its center; a circumferential wall portion 47, formed on the outer circumferential area of the circular portion 30; and a flange portion 20, which is located at the tip of the circumferential wall portion 47 and which extends outwardly in the radial direction. The central opening 15 has, at its edge, a portion 14 bent in the axial direction. This bent portion 14 provides stability to the edge of the central opening 15 and also provides a relatively large joint face with an inner cylindrical member 16. The inner cylindrical member 16 is provided so as to fit into the central opening 15, and the end surface 17 of one end of this inner cylindrical member 16 is designed to become level with the end surface 18 of the bent area 14.

The diffuser shell 1 and the closure shell 2 form the housing 3 by laying the flange portion 19 of the diffuser shell on top of the flange portion 20 of the closure shell, at the central cross-section in the axial direction of housing 3, and joined together by laser welding 21. The flange portions 19 and 20 provide stability to the housing, especially to its outer circumferential wall 8, in order to prevent deformation of the housing due to the gas pressure.

The inner cylindrical member 16 is made of a stainless steel tube, one end of which is joined to the inner surface of the protruding circular portion 13 of the diffuser shell 1, and the other end of which is open. It is fixed to the protruding circular portion 13 of the diffuser shell by electron-beam welding 22. An igniting means storage chamber 23 is formed inside the inner cylindrical member 16. The interior of the igniting means storage chamber 23 is provided with the initiator 4, which is activated by a signal from a sensor (not shown in the Figure) and an enhancer container 53, which contains the enhancer 5 to be ignited by the initiator 4.

Figure 2A:
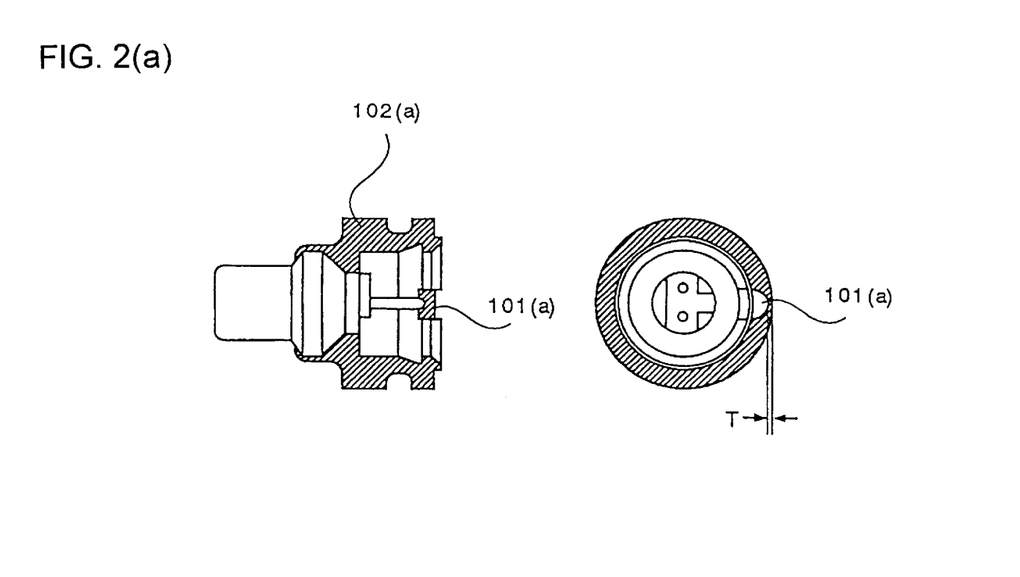
FIG. 2 is a diagram showing how the positioning portion is formed in the initiator collar.
Figure 2B:
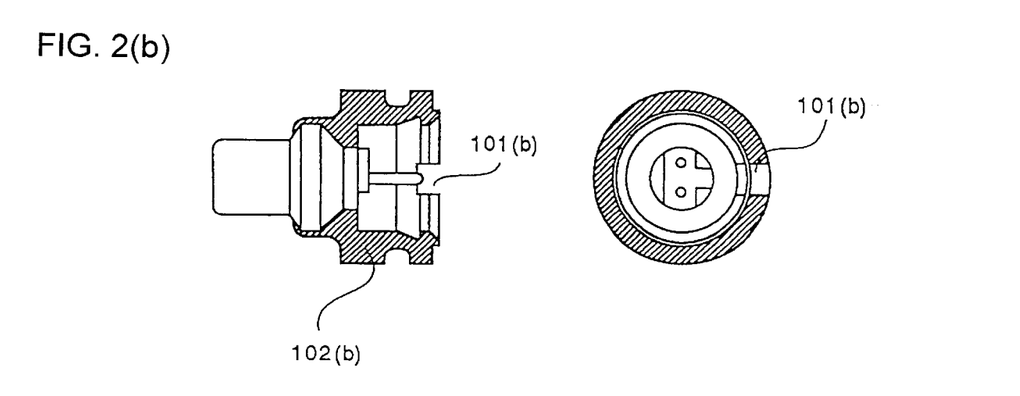

Examples of the initiator 4, to which the initiator collar is installed and which is used in the air bag gas generator of the present invention, are shown in FIGS. 2(a) and 2(b). In each drawing (FIG. 2(a) and FIG. 2(b)), respectively, the vertical cross section of the initiator is shown on the left hand side and its bottom surface is shown on the right hand side. Initiator collars (102(a), 102(b)), each of which is hollow and semi-cylindrical in shape and has a positioning portion formed at the bottom surface, are incorporated into the lower portion of the initiator 4 as shown in FIGS. 2(a) and 2(b). This positioning portion can be, as shown in FIG. 2(a), a step helix 101(a), which is formed by cutting a part of the bottom surface of the initiator collar 102(a) into a step helix form in the radial direction, with the edge retained by a prescribed thickness T, or as shown in FIG. 2(b), a groove 101(b) can be formed by cutting a part of the bottom surface of the initiator collar 102(b) in the radial direction, without retaining the edge. As shown in FIG. 2(a), when the gas generator is formed for an air bag using the initiator collar, where the positioning portion has been formed by cutting it into a step helix shape, with the edge of initiator collar 102(a) retained, it is possible to more reliably prevent the combustion gas from leaking between the inner surface of the area containing the initiator 4 and the outer circumferential surface of the initiator collar 102, even when the gas generator for an air bag is in operation.

Figure 3:
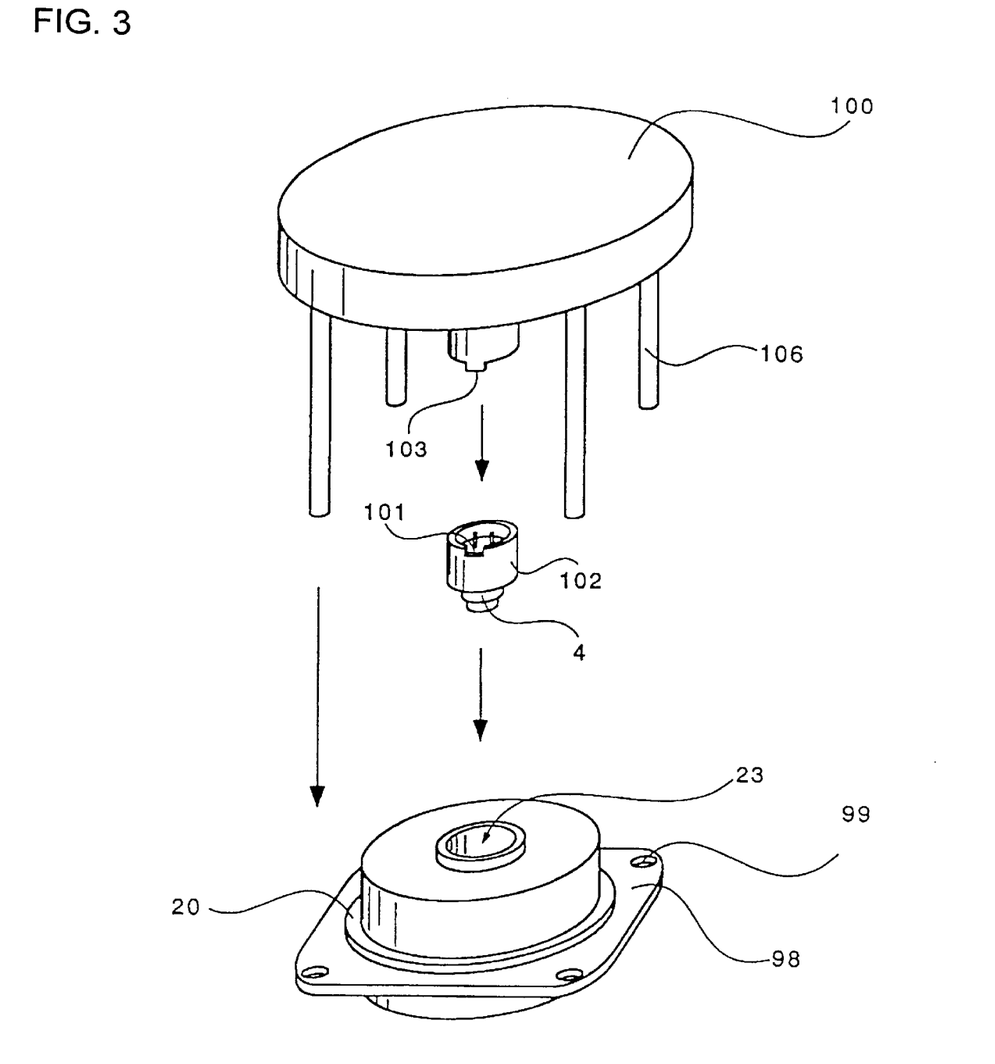
FIG. 3 is a conceptual diagram showing an initiator installation process.
Figure 4:
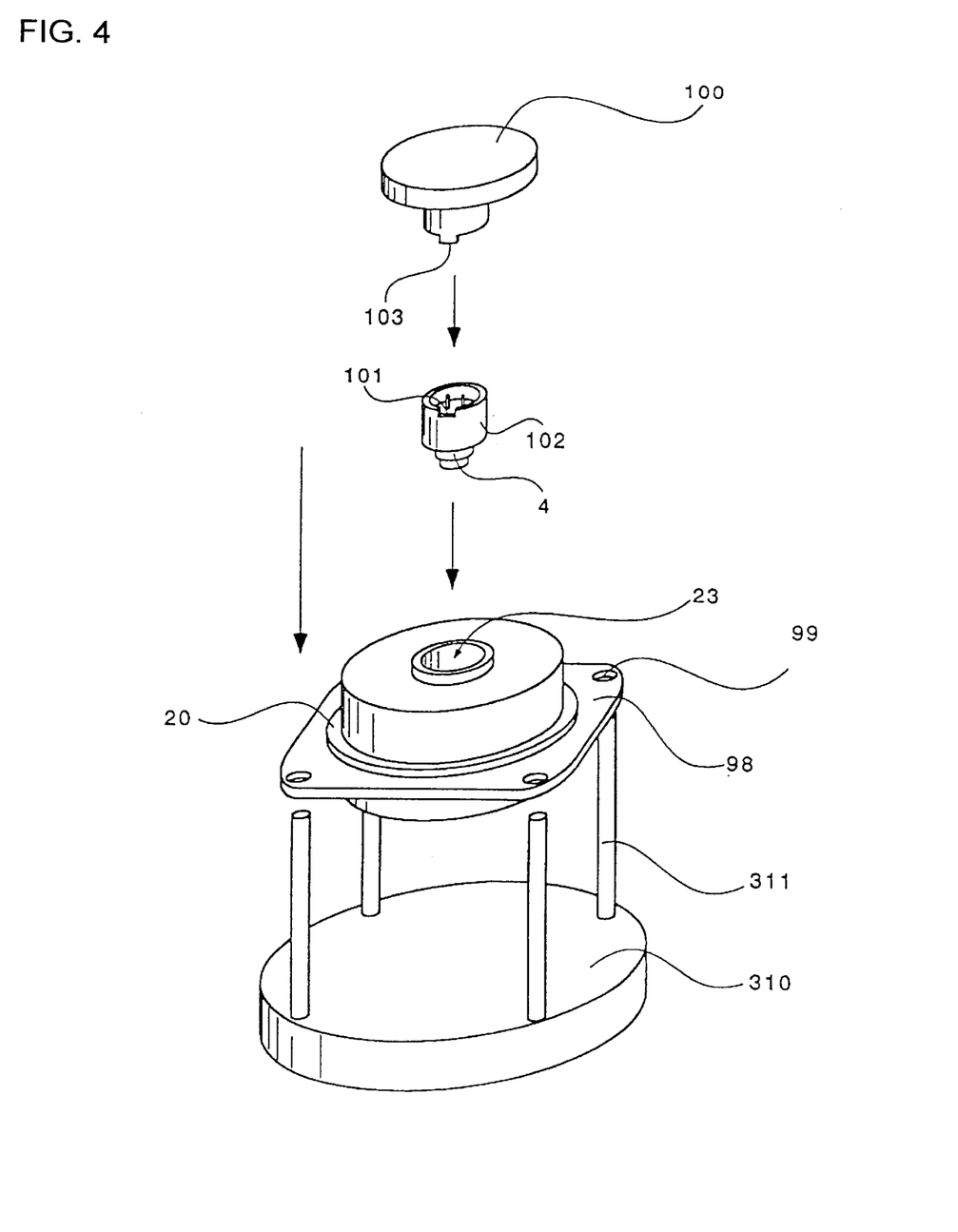
FIG. 4 is a conceptual diagram showing another initiator installation process.

The initiator 4, as shown in FIG. 3, is installed in the igniting means storage chamber 23 after positioning the initiator 4 using an insertion jig 100. In other words, the initiator 4, integrated with the initiator collar 102, is positioned by: providing an initiator collar 102, having a positioning groove 101 formed by cutting a circumference thereof, in a prescribed direction at a lower portion of the initiator 4, and engaging an engaging portion 103 of the insertion jig 100 with the positioning groove 101. The positioned initiator 4 is installed in the igniting means storage chamber 23. When a gas generator attachment portion 98 for attaching the air bag gas generator to a module case is formed, and the initiator 4 is positioned with respect to the gas generator attachment portion 98, the insertion jig 100 is positioned with respect to the gas generator attachment portion 98, and the initiator 4 can be positioned using the positioned insertion jig 100, as described above. In FIG. 3, the insertion jig 100 is positioned with respect to the gas generator attachment portion 98 by inserting insertion pins 106, provided in insertion jig 100, through attachment holes 99 in the gas generator attachment portion 98. Aside from this, as shown in FIG. 4, the initiator can be installed by inserting pins 311 of the positioning jig 310 into attachment holes 99 in the gas generator attachment portion 98, fixing the gas generator, and engaging the engaging portion 103 of insertion jig 100 with the positioning portion 101 of the initiator collar. By positioning the insertion jig 100 to the positioning jig 310 in advance, the initiator installed by the insertion jig can be positioned.

In the embodiment shown in FIG. 3, the engaging portion 103 of the insertion jig 100 is engaged with the positioning groove 101 of the initiator collar 102 by using the insertion jig 100, which has been positioned with respect to the gas generator attachment portion 98, and the initiator 4 is installed in the igniting means storage chamber 23 while positioning the initiator collar 102. As a result, the initiator 4, to which the initiator collar 102 is installed in a restricted, prescribed direction and incorporated, is also positioned and then installed in the igniting means storage chamber 23.

Figure 5:
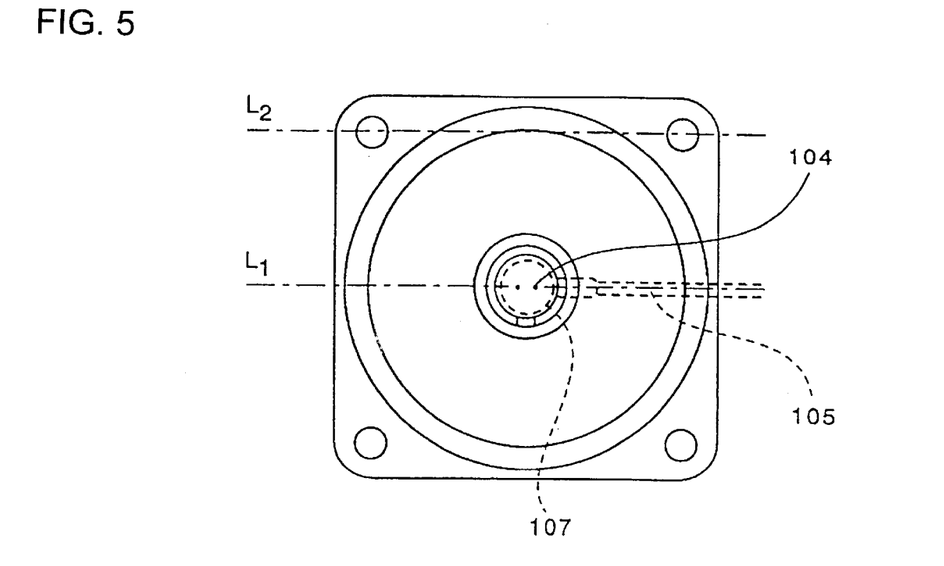
FIG. 5 is a drawing of a bottom surface of the gas generator for an air bag showing how the initiator is installed.
Figure 6:
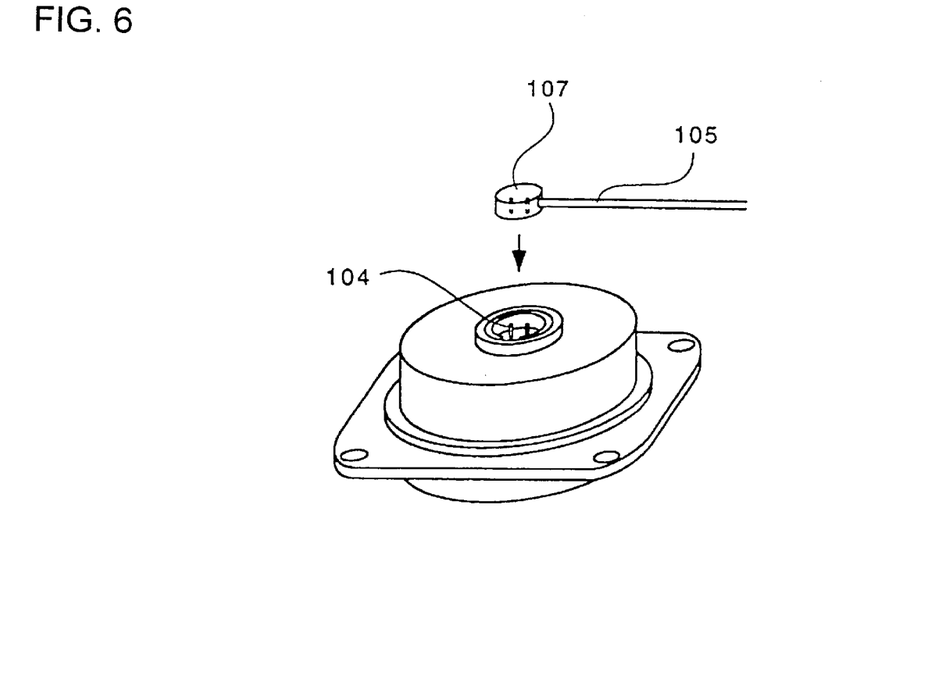
FIG. 6 is a diagonal view showing the process of connecting the connector to the air bag gas generator of the present invention.

The initiator 4, which is positioned by the insertion jig 100 and then inserted, is preferably installed at the lower portion of the initiator 4 such that, as shown in FIG. 5, the orientation L1 of electric conductive terminals 104 is constant with respect to the attachment openings 99 of the gas generator attachment portion 98. The positional relationship between these electric conductive terminals 104 and the attachment openings 99 is restricted, for example, such that the orientation L1 of the terminals 104 and the orientation L2 of the adjacent attachment opening 98 in the gas generator attachment portion 98 is either parallel, perpendicular or at a prescribed angle. Since, the initiator 4 is positioned, and then the orientation L2 of the terminals 104 is fixed, as stated above, the lead wire 105 extending in a direction determined by the orientation of the connector 107 which is connected to the terminals 104, will always be drawn in a fixed direction, as shown in FIG. 6. As a result, the initiator 4 and the sensor (not shown in the Figure) can be reliably connected by the lead wire 105.

The initiator 4, which is installed in the igniting means storage chamber 23 after being positioned with the insertion jig 100, as described above, is fixed by the initiator holding member 24 in the inner cylindrical member 16, as shown in FIG. 1. The holding member 24 has: a flange portion 25, which faces inward to restrict the axial movement of the initiator 4; a circumferential wall portion 26 where the initiator is fitted and fixed on the inner circumferential surface of the inner cylindrical member 16; and a crimping portion 27, which fixes the initiator in the axial direction by crimping the inward facing flange portion 25. In FIG. 1, the inner cylindrical member 16 has through-holes 54 close to one end of the circumferential wall. Further, in the present embodiment, six 2.5 mm diameter through-holes are provided at equal intervals in the circumferential direction, and the through-holes 54 are sealed with a sealing tape 52'.

The inner cylindrical member 16 can be formed by rolling a 1.2–3.0 mm thick stainless steel sheet into a tube and welding it into a cylindrical member having a 17–22 mm outer diameter. This kind of welded tube can be formed by using, for instance, the UO press method (the sheet is formed into a U shape, then formed into an O shape, and the seam is welded), the electrical seam tube method (the sheet is formed into a circular shape, and the seam is welded with resistance heat by applying a large electrical current while adding pressure to the seam.), etc. Aside from these, the inner cylindrical member 16 can be formed by either casting, forging, or press or cutting work, etc., or a combination of these. Incidentally, after providing a welding area at one end of the inner cylindrical member, the welding area can be joined to the inner surface of protruding circular portion 13 of the diffuser shell 1.

The coolant/filter 7 is provided, enclosing the gas generating agents 6, and defines a ring-shaped chamber, i.e., a combustion chamber 28 around the inner cylindrical member 16. This coolant/filter 7 is formed by overlaying a plain stitched, stainless steel wire mesh in the radial direction, and compressing it in the radial and axial directions. The coolant/filter 7 is multi-layered in the radial direction and each layer of which has a shape in which loop-like stitches have been mashed. Therefore, spacing structure inside the coolant/filter is complex, so that the coolant filter has an excellent residue trapping effect. In order to prevent the plenum 9 from being blocked due to the expansion of the coolant/filter 7 by the gas pressure when the gas generator is in operation, the outer layer 29, which functions as the inhibiting means to restrict the expansion of the coolant/filter, is formed on the outside of the coolant/filter 7. This outer layer 29 can be formed, for instance: using a laminated wire mesh body; a perforated cylindrical member having through-holes in the circumferential wall surface; or a belt-shaped inhibiting layer in which a belt member with a prescribed width is made into a ring-shape. When the outer layer 29 is formed of the laminated wire mesh body, the outer layer 29 can also have a cooling function. The coolant/filter 7 defines the combustion chamber 28 and cools the combustion gas generated in the combustion chamber, and traps the combustion residue.

The tilted portion 31 is formed in the circumferential direction, surrounding the circular portion 30 of the closure shell. This tilted portion 31 prohibits movement of the coolant/filter 7, and also as means to create a plenum between the outer circumferential wall 8 of the housing and the coolant/filter 7.

Many solid gas generating agents 6 are provided in the combustion chamber 28. A gas generating agent 6 is a hollow cylinder in shape. Because of this shape, combustion occurs at the outer and inner surfaces. This shape is advantageous in that as the combustion progresses, the surface area of the entire gas generating agent changes very little.

A plate member 32 is provided on the upper end of the coolant/filter 7, and a plate member 33 provided on its lower end. A plate member 32 is includes: a circular portion 36, which closes an opening 40 at the upper end of the coolant/filter 7; and a circumferential wall portion 34, which is integrated with the circular portion 36 and directly contacts the inner circumferential surface 41 of the coolant/filter. The circular portion 36 has a central opening 35, which fits in the outer circumference of the above-mentioned inner cylindrical member 16. The circumferential wall portion 34 is positioned to face through-holes 54 for the flame from the igniting means. The wall portion 34 covers the coolant/filter inner surface 41 close to the through-holes 54. The circumferential wall portion 34 functions to protect the coolant/filter from the flame bursting toward the coolant/filter 7 and also to deflect the direction of the flame to sufficiently spread the flame toward gas generating agents 6. The plate member 32 is fixed to inner cylindrical member 16 with respect to the radial movement thereof. The plate member 32 functions as means for positioning the coolant/filter 7 when assembling the gas generator and also as a short-pass prevention means for preventing the so-called short-passing of the combustion gas. That is, the combustion gas does not pass through the coolant/filter but passes through a gap between the inner surface 37 of the housing and the end surface 38 of the coolant/filter which is created due to the pressure of the combustion gas when the gas generator is in operation.

A plate member 33 is composed of: a circular portion 50, which closes the opening 42 at the lower end of the coolant/filter 7; and a circumferential wall portion 51, which is integrated with the circular portion 50 and directly contacts the inner circumferential surface 41 of the coolant/filter. The circular portion 50 has a central opening 39 which fits in the outer circumference of the inner cylindrical member 16, and it directly contacts the existing gas generating agents to restrict the movement thereof. This plate member 33 is held between the inner cylindrical member 16 and the coolant/filter 7 by an elastic force. It prevents the combustion gas from short-passing at the above-mentioned end surface 38 and the opposite end surface 43 of the coolant/filter, and functions as a welding protection plate at the time of welding.

The plenum 9 is formed between the outer circumferential wall 8 of the housing and the outer layer 29 of the coolant/filter. This plenum 9 forms, around the coolant/filter 7, a gas channel whose radial cross-section is ring-shaped. It is desirable for area St at the radial cross-section of the gas channel to be made greater than the total sum At of the opening area of each gas discharge port 11 of the diffuser shell. In this embodiment, the area of the radial cross-section of the gas channel is constant, but it is possible to increase the area of the radial cross-section of the gas channel as it gets closer to the gas discharge ports 11, for instance, by forming the coolant/filter into a conical shape. In this case, for the area of the radial direction cross-section of the gas channel, a mean value may be used. Due to the existence of the gas channel around the coolant/filter, the combustion gas passes through the entire region of the coolant/filter and flows toward the gas channel. Because of this, effective use of the coolant/filter and effective cooling and purifying of the combustion gas are achieved. The combustion gas, which has been cooled and purified, passes through the above-mentioned gas channel and reaches the gas discharge ports 11 in the diffuser shell.

Incidentally, in this embodiment, an explanation was given, referring to an example in which the plenum is formed between the outer circumferential wall of the housing and the coolant/filter, but the plenum can be omitted.

In order to prevent the outside moisture from entering the housing 3, the gas discharge ports 11 in the diffuser shell are sealed with an aluminum tape 52.

When assembling this gas generator, the diffuser shell 1, to which the inner cylindrical member 16 has been joined by welding is placed with its protruding circular portion 13 at the bottom, the plate member 32 is inserted through the inner cylindrical member 16. The coolant/filter 7 is fitted outside of the circumferential wall portion of the plate member 32, and the coolant/filter 7 is positioned. Inside the coolant/filter 7, the solid gas generating agents 6 are provided. Then, the plate member 33 is provided on top. Next, the inner cylindrical member 16 is inserted through the central opening 15 of the closure shell. The flange area 20 of the closure shell is laid on top of the flange area 19 of the diffuser shell, and laser welding 21 and 44 are provided to join the diffuser shell 1 with the closure shell 2 and the closure shell 2 with the inner cylindrical member 16. Finally, the enhancer container 53 and the initiator 4 are inserted into the inner cylindrical member 16. These are fixed by crimping the crimping portion 27 of the initiator holding member.

In the gas generator having such a structure, when the sensor (not shown in the Figure) detects an impact, its signal is sent to the initiator 4 to activate the initiator 4. Because of this, the enhancer 5 inside the enhancer container 53 is ignited and produces a high-temperature flame. This flame bursts from the through-holes 54 and ignites the gas generating agents 6 close to the through-holes 54. It also ignites the gas generating agents at the lower portion of the combustion chamber, with its course being deflected by the circumferential wall portion 34. Due to this, the gas generating agents burn and produce a high-temperature/high-pressure gas. This combustion gas passes through the entire region of the coolant/filter 7, during which period it is effectively cooled or its combustion residue trapped. The combustion gas, which has been cooled and purified, passes through the gas channel (plenum 9), ruptures the wall of the aluminum tape 52, ejects from the gas discharge ports 11, and flows into the air bag (not shown in the Figure). Because of this, the air bag inflates and forms a cushion between a passenger and hard structures, protecting the passenger from an impact. The above-mentioned step 49 of the diffuser shell circular portion and the above-mentioned bent portion 14 of the closure shell circular portion provide rigidity to the ceiling and bottom portions of the housing to prevent deformation of the housing due to gas pressure.

Also, the flange areas 19 and 20, which overlap and joined at the central cross-section in the axial direction of the housing, provide stability to the outer circumferential wall 8 of the housing to prevent deformation of the housing due to the gas pressure. Moreover, when a gap is created at the end surface of the coolant/filter, the short-passing of the combustion gas is prevented by the above-mentioned plate members 32 and 33.

Figure 7:
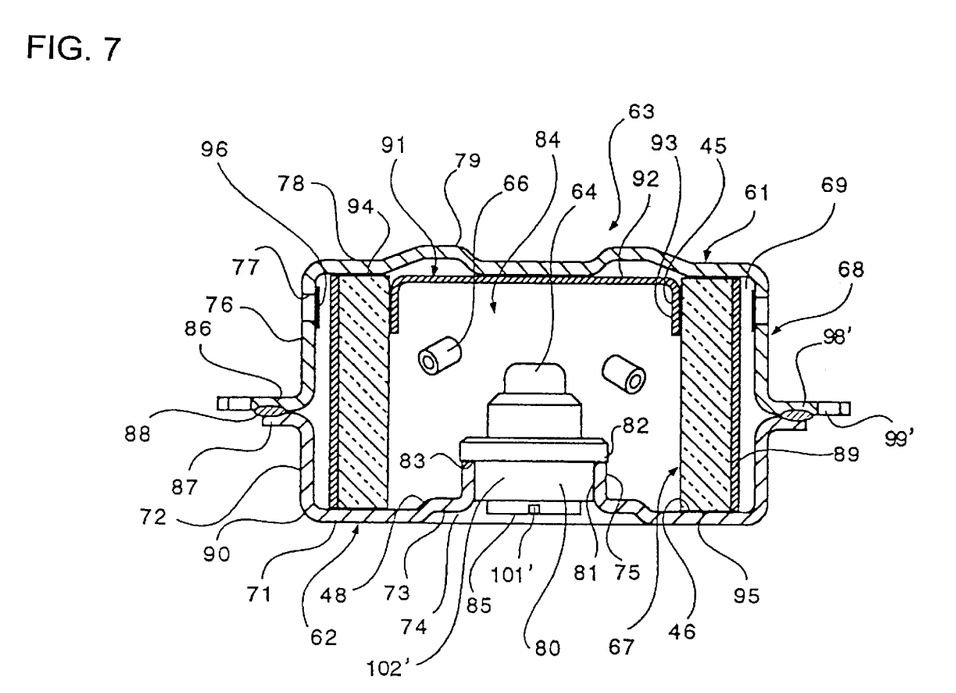
FIG. 7 is a vertical cross-sectional view of another embodiment of the gas generator of the present invention.

Unlike the gas generator shown in FIG. 1, FIG. 7 is a vertical cross-sectional view of another preferred embodiment of the gas generator of the present invention, in which the inner cylindrical member is not provided in the housing 63 and the inside of the housing consists of a single chamber. The gas generator shown in this Figure includes: a housing 63, which is has a diffuser shell 61 and a closure shell 62; filter means, which, along with the housing 63, defines a combustion chamber 84, i.e., a coolant/filter 67; an initiator 64, which is positioned and then installed in the above-mentioned combustion chamber 84; solid gas generating agents 66, which are provided adjacent to this initiator 64 and ignited by the initiator 64 and generate the combustion gas. The positioning portion is formed at the lower surface of the initiator collar, which is installed at the lower portion of the initiator 64, as with the initiator shown in FIG. 2.

The diffuser shell 61 is formed by pressing a stainless steel sheet and has: a circular portion 78; a circumferential wall portion 76, formed on its outer circumferential portion; and a flange portion 86, which is located at its tip and extends outwardly in the radial direction. The flange portion 86, formed in the diffuser shell 61, is provided with the gas generator attachment portion 98', which attaches the gas generator for an air bag to the module case. This gas generator attachment area 98' is formed with attachment holes 99' through which screws or pins for fixing the gas generator are inserted. The circumferential wall portion 76 is provided with gas discharge ports 77 at equal intervals in the circumferential direction. Multiple reinforced portions 79, having a rib shape in the radial direction, are provided radially on circular portion 78 of the diffuser shell 61. These rib-shaped reinforced portions 79 provide rigidity to the housing, especially to the diffuser shell circular portion 78, which forms its ceiling portion, and they prevent deformation of the housing due to the gas pressure.

The closure shell 62, formed by pressing a stainless steel sheet, has a circular portion 71, a circumferential wall portion 72 formed on its outer circumferential portion, and a flange portion 87, which is located at its tip and extends outwardly in the radial direction. A concavity 73 is formed by a step 48 at the center of the circular portion 71, and a central opening 74 is formed at the center of the concavity 73. The central opening 74 has a bent portion 75 at its edge, bent along an axial direction. The bent portion 75 has an inner circumferential surface 81, into which a drum 80 of the initiator collar is fitted, and the end surface 83 where the flange 82 of the initiator collar is secured. Due to the structure of the inner circumferential surface 81 of the axially bent area 75, a relatively large seal surface is obtained. In order to secure air tightness, a sealing material can be filled in the space between the drum 80 and the inner circumferential surface 81. Also, the flange 82 and the end surface 83 can be welded. The end surface 83 of the initiator, where the flange 82 of the initiator is secured, prevents the initiator 64 from being pushed out by the gas pressure in the combustion chamber 84. The step 48 provides rigidity to the housing, especially to the closure shell circular portion 71, which forms its bottom portion. In the concavity 73, the connector bottom surface 85 of the initiator is positioned more toward the inside than the outer surface of the circular portion 71. The bent portion 75 also provides rigidity to the edge of the central opening 74.

The diffuser shell 61 and the closure shell 62 are joined to form the housing 63 by overlapping the flange portions 86 and 87 of the two shells, at the central cross-section in the axial direction of the housing 63, while positioning the initiator 64 joined to the closure shell 62 by the insertion jig, and the flange portions are joined by laser welding 88. The initiator 64 is positioned so that the electric conductive terminals (not shown in the Figure), which are located at the bottom of the initiator 64, may be always oriented at a prescribed direction to the diffuser's attachment portion 98' in the vehicle. As a result, since the diffuser 61 and the closure shell 62 are joined after they are positioned, the orientation of the terminals to the attachment portion 98' at the vehicle side is always constant, making it possible to reliably connect the initiator 4 to the sensor by the lead wire.

The housing 63 is formed by joining the diffuser shell 61 with the closure shell 62 as described above. Joined flange portions 86 and 87 provide rigidity to the outer circumferential wall 68 of the housing to prevent deformation of the housing due to the gas pressure.

In FIG. 7, the initiator 64 is composed of a conventional electrical type initiator, which is activated by a signal from a sensor (not shown in the Figure), and its lower portion is provided with an initiator collar 102', which has a positioning portion. The electrical type initiator 64 is preferable over a mechanical method because it does not employ a mechanical system, has a simple structure, smaller in size, and lighter in weight. This initiator 64 (e.g., output: 300–1500 psi in a 10 cc sealed pressure container) is not provided with the transfer charge container or the like utilized in the conventional gas generator. This is due to the good igniting and combustion characteristics of the gas generating agents 66. That is, the gas generating agent 66 has a decomposition initiation temperature of 330° C. or less and a combustion temperature of 2000K or higher. A gas generating agent 66 is a hollow cylinder in shape. Because of this shape, combustion occurs at the outer and inner surfaces. This is advantageous because the surface area of the entire gas generating agent changes very little as the combustion progresses.

The coolant/filter 67, similar to the coolant/filter used in the air bag gas generator shown in FIG. 1, is formed by overlaying plain stitched, stainless steel wire mesh in the radial direction and compressing it in radial and axial directions. It has layers composed of loop-like stitches that have been mashed in the radial direction. In order to prevent the plenum 69 from being blocked due to the expansion of the coolant/filter 67 by the gas pressure when the gas generator is in operation, an outer layer 89 can be provided on the outside of the coolant/filter 67. The outer layer 89 can be formed by using a laminated wire mesh body or a perforated cylindrical member.

The tilted portion 90, formed in the circumferential direction and surrounding the circular area 71 of the closure shell, functions as means to determine the position of the coolant/filter 67 and to prohibit its movement. It also forms a plenum 69 between the outer circumferential wall 68 of the housing and the outer layer 89 of the coolant/filter.

Many solid gas generating agents 66, each of which are hollow cylinder in shape, are provided in the combustion chamber 84. In this embodiment, the gas generating agents 66 directly fill the space in the combustion chamber and are placed adjacent to the initiator 64. Their movements are restricted by the circular portion 92 of the plate member, which blocks the opening 45 of one end of the coolant/filter 67. The plate member 91 has the above-mentioned circular portion 92 and the circumferential wall portion 93, which is incorporated into the above-mentioned circular portion 92 and which directly contacts the inner circumferential surface of one end of the coolant/filter 67 to cover the inner circumferential surface. By means of this plate member 91, short-passing of the combustion gas between the end surface 94 of one end of the coolant/filter and the inner surface of the diffuser shell circular portion 78 is prevented. The end surface 95 of the other end of the coolant/filter, where the plate member 91 is not provided, is fixed to the inner surface 46 of the housing via welding. Because of this, short-passing at the end surface 95 is prevented. By providing welding, a flame retardant and elastic packing, for instance, made of silicon rubber, which is normally provided between the coolant/filter end surface and the housing inner surface, becomes unnecessary.

The plenum 69 is formed between the outer circumferential wall 68 of the housing and the outer layer 89 of the coolant/filter. The plenum 69 forms, around the coolant/filter 67, a gas channel having a ring-shaped radial cross-section. The area at the radial cross-section of the gas channel is made greater than the total sum of the opening area of each gas discharge port 77 of the diffuser shell. Due to the existence of the gas channel around the coolant/filter, the combustion gas passes through the entire region of the coolant/filter and moves toward the gas channel. Because of this, effective use of the coolant/filter and effective cooling and purifying of the combustion gas are achieved. The combustion gas, which has been cooled and purified, passes through the above-mentioned gas channel and reaches the gas discharge ports 77 in the diffuser shell. In order to prevent outside moisture from entering the housing 63, the gas discharge ports 77 in the diffuser shell are sealed with an aluminum tape 96 from the inner side of the housing.

Figure 8:
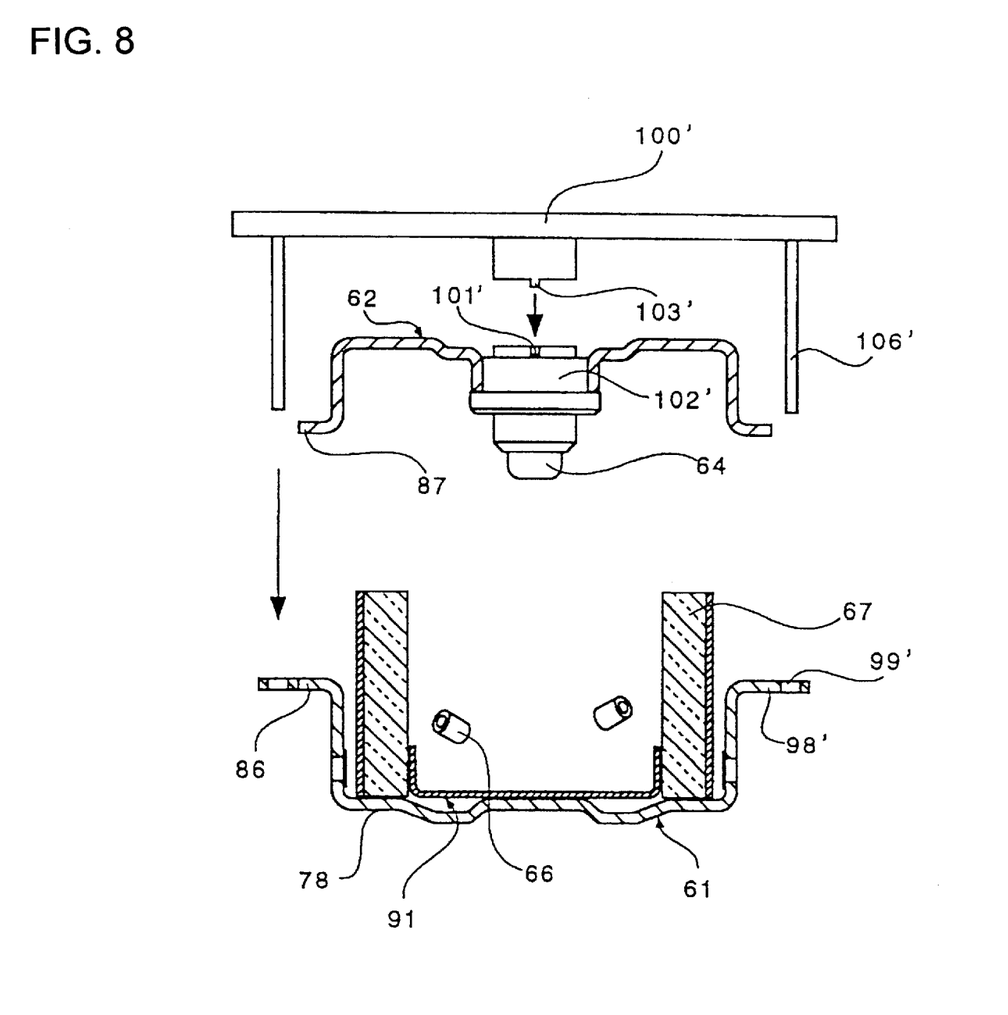
FIG. 8 is a conceptual diagram showing the manufacturing process for the gas generator shown in FIG. 7.

An example of a manufacturing method for the gas generator of the present embodiment will be described by referring to FIG. 8. When assembling this gas generator, the diffuser shell 61 is placed with the circular portion 78 at the bottom, and the plate member 91, the coolant/filter 67, and the solid gas generating agents 66 are provided therein. Then, the closure shell 62, to which the initiator 64 has been provided to the central opening 74 in advance, is positioned by engaging the positioning portion 101'—of the initiator collar 102' installed at the lower portion of the initiator 64—with the engaging portion 103' of the insertion jig 100', and by also inserting the insertion pins 106' of the insertion fitting into attachment holes 99' provided to the attachment portion 98' of the diffuser shell 61. The flange areas 86 and 87 of the two shells are overlaid. The flange portions are joined by laser welding, etc., and the diffuser shell 61 and the closure shell 62 are joined together.

In the gas generator having this structure, when the sensor (not shown in the Figure) detects an impact, its signal is sent to the initiator 64 to activate the initiator 64. This ignites the gas generating agents 66 inside the combustion chamber 84. Because of this, the gas generating agents burn and produce a high-temperature/high-pressure gas; and this combustion gas enters the coolant/filter 67 from the entire region of the coolant/filter 67 and passes through the coolant/filter 67, during which period it is cooled and its combustion residues collected. The combustion gas, which has been cooled and purified, passes through the gas channel formed by plenum 69, ruptures the wall of the aluminum tape 96, ejects from the gas discharge ports 77, and flows into the air bag (not shown in the Figure). Because of this, the air bag inflates and forms a cushion between a passenger and hard structures, protecting the passenger from an impact. The above-mentioned reinforced rib 79 of the diffuser shell circular portion and the above-mentioned step 48 and the bent portion 75 of the closure shell circular portion provide rigidity to the ceiling and bottom areas of the housing to prevent deformation of the housing due to the gas pressure. The flange areas 86 and 87, which overlap and join at the central cross-section in the axial direction of the housing, provide rigidity to the outer circumferential wall 68 of the housing to prevent deformation of the housing due to gas pressure. Moreover, when a gap is created at the end surface of the coolant/filter, short-passing of the combustion gas is prevented by the above-mentioned plate member 91. Since the end surface 95 on the opposite side is secured to the housing inner surface by welding, no gap is created between these two.

Figure 9:
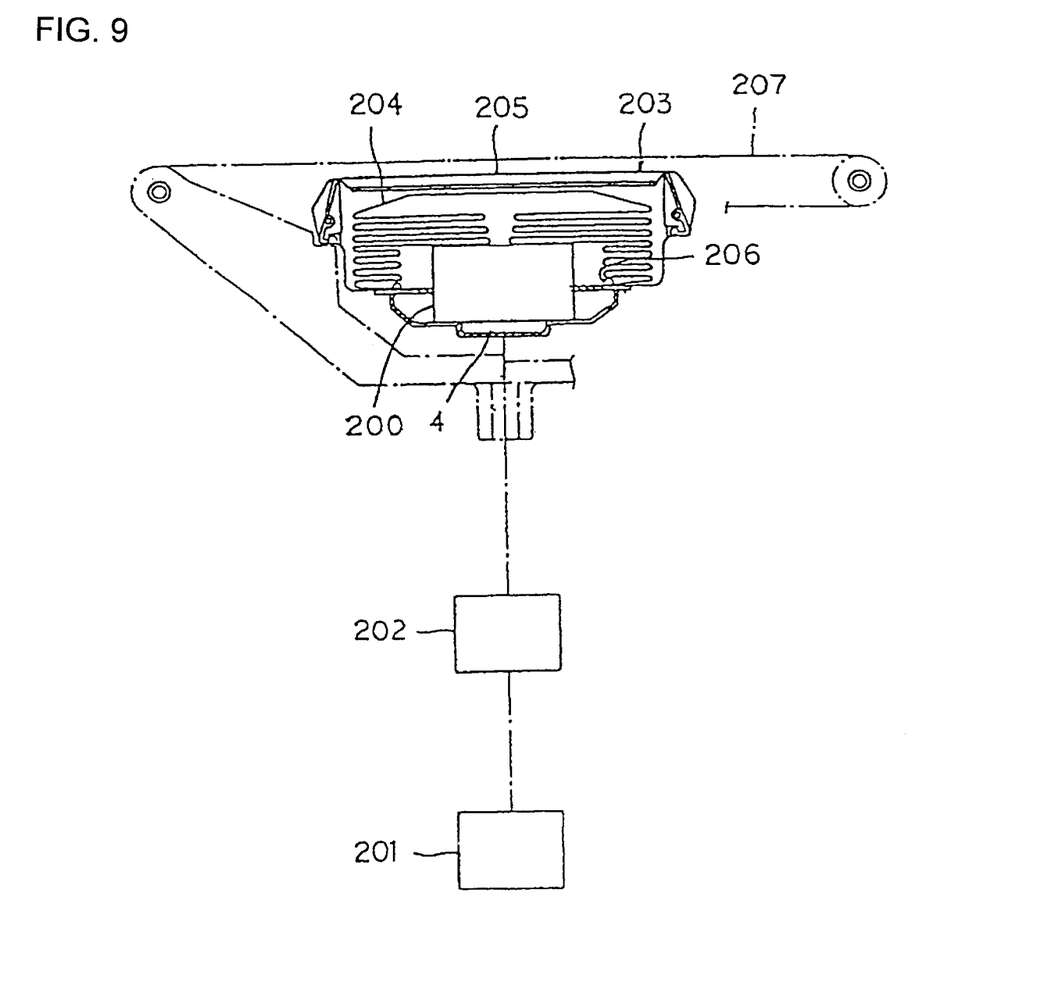
FIG. 9 is a configuration of the air bag system of the present invention.

FIG. 9 shows an embodiment of an air bag system of the present invention constituted to include a gas generator using the electrical ignition type igniting means. This air bag system consists of a gas generator 200, an impact sensor 201, a control unit 202, a module case 203, and an air bag 204.

Since the gas generator explained according to FIG. 1 is used as the gas generator 200, the orientation of the electric conductive terminals of the initiator in the gas generator 200 is fixed, making it possible to reliably connect the lead wire.

The impact sensor 201 is composed, for instance, of a semiconductor-type acceleration sensor. This semiconductor-type acceleration sensor has four semiconductor strain gauges formed on the silicon substrate beam, which is designed to deflect when acceleration occurs. These semiconductor strain gauges are bridge connected. When acceleration occurs, the beam is deflected, and the surface is strained. Because of this strain, the resistance of the semiconductor strain gauges changes, and this resistance change is detected as a voltage signal that is proportional to the acceleration.

Control unit 202 has an ignition evaluation circuit, and the signal from the above-mentioned semiconductor-type acceleration sensor is inputted in this ignition evaluation circuit. The control unit 202 begins its calculation at the point at which this impact signal exceeds a certain value. It outputs the activation signal to the initiator 4 of the gas generator 200 when the calculation result exceeds a certain value.

As described above, the orientation of the electric conductive terminals (not shown in the Figure) of the initiator in the gas generator 200 is fixed, so that the lead wire, which transmits the activation signal output from the control unit 202 to the initiator, can always be drawn in a fixed direction, ensuring that the wire is not too short.

The module case 203, made of a polyurethane, for example, includes a module cover 205. The air bag 204 and the gas generator 200 are installed inside the module case 203 to constitute a pad module. This pad module is attached to the steering wheel 207 of an automobile.

The air bag 204 is formed of nylon (nylon 66, for example) or polyester, etc., and it is secured to the flange portion of the gas generator, with the air bag opening 206 enclosing the gas discharge ports of the gas generator while being folded.

When the semiconductor acceleration sensor 201 detects an impact at the time of an automobile collision, its signal is transmitted to the control unit 202, and the control unit 202 begins its calculation at the point at which the impact signal from the sensor exceeds a certain value. It outputs the activation signal to the initiator 4 of the gas generator 200 when the calculation result exceeds a certain value. Because of this, the initiator 4 is activated to ignite the gas generating agents, which then burn and generate a gas. This gas is ejected into the air bag 204, whereby the air bag breaks the module cover 205 and inflates, forming a cushion that absorbs an impact between the steering wheel 207 and a passenger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An air bag gas generator, comprising:
   a housing having a storage opening and an attachment portion having a first attachment opening and a second attachment opening for attaching said housing to a vehicle;
   an initiator having a first electric terminal and a second electric terminal to be engaged with a connector having a lead wire provided on a side of the vehicle, said initiator further including a collar having a recess portion, extending only in an axial direction of said initiator, at a predetermined position with respect to said first and second electric terminals, such that said recess portion can be positioned at a predetermined position with respect to said first attachment opening and said second attachment opening when installing said initiator in said storage opening;

gas generating means ignited by said initiator for burning and generating a combustion gas; and a coolant/filter for at least one of cooling the combustion gas and collecting combustion residues, wherein the lead wire extends in a predetermined direction with respect to said first attachment opening and said second attachment opening when the connector having the lead wire is connected to said initiator.

2. The air bag gas generator according to clam 1, wherein an inner face of said storage opening is formed with an engaging portion located at a predetermined position with respect to the first and second attachment openings for engaging with said recess portion.

3. The air bag gas generator according to claim 1, wherein said recess portion is formed by cutting a portion of a lower end face of said collar portion in a radial direction while retaining an edge portion thereof.

4. The air bag gas generator according to claim 1, wherein said recess portion is a groove formed by cutting a portion of a lower end face of said collar portion in a radial direction.

5. The air bag gas generator according to claim 1, wherein said attachment portion is a flange portion of said housing.

6. The air bag gas generator according to claim 1, wherein an engaging portion for engaging with said recess portion is provided on an insertion jig positioned in a predetermined orientation with respect to said first attachment opening and said second attachment opening, and said initiator is inserted into the storage opening by said insertion jig while the engaging portion is being engaged with the recess portion.

7. An air bag system, comprising: an air bag gas generator including, a housing having a storage opening and an attachment portion having a first attachment opening and a second attachment opening for attaching said housing to a vehicle, an initiator having a first electric terminal and a second electric terminal to be engaged with a connector having a lead wire provided on a side of the vehicle, said initiator further including a collar having a recess portion, extending only in an axial direction of said initiator, at a predetermined position with respect to said first and second electric terminals, such that said recess portion can be positioned at a predetermined position with respect to said first attachment opening and said second attachment opening when installing said initiator in said storage opening, gas generating means ignited by said initiator for burning and generating a combustion gas, and a coolant/filter for at least one of cooling the combustion gas and collecting combustion residues, wherein the lead wire extends in a predetermined direction with respect to said first attachment opening and said second attachment opening when the connector having the lead wire is connected to said initiator;

an air bag inflated by introducing a gas generated by said gas generator; and a module case that contains said air bag.

8. An air bag gas generator, comprising:

a housing having a storage opening and an attachment portion having a first attachment opening and a second attachment opening for attaching said housing to a vehicle; and an initiator having a first electric terminal and a second electric terminal to be engaged with a connector having a lead wire provided on a side of the vehicle, said initiator further including a collar having a recess portion, extending only in an axial direction of said initiator, at a predetermined position with respect to said first and second electric terminals, such that said recess portion can be positioned at a predetermined position with respect to said first attachment opening and said second attachment opening when installing said initiator in said storage opening;

wherein the lead wire extends in a predetermined direction with respect to said first attachment opening and said second attachment opening when the connector having the lead wire is connected to said initiator.

* * * * *